H. L. JOHNSON.
CARTON SEALING MACHINE.
APPLICATION FILED JAN. 27, 1912.
1,052,667.
Patented Feb. 11, 1913.
7 SHEETS—SHEET 4.
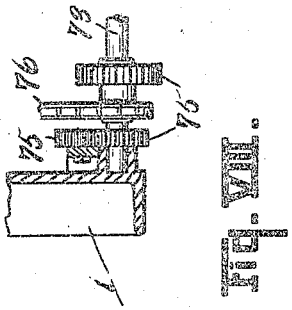
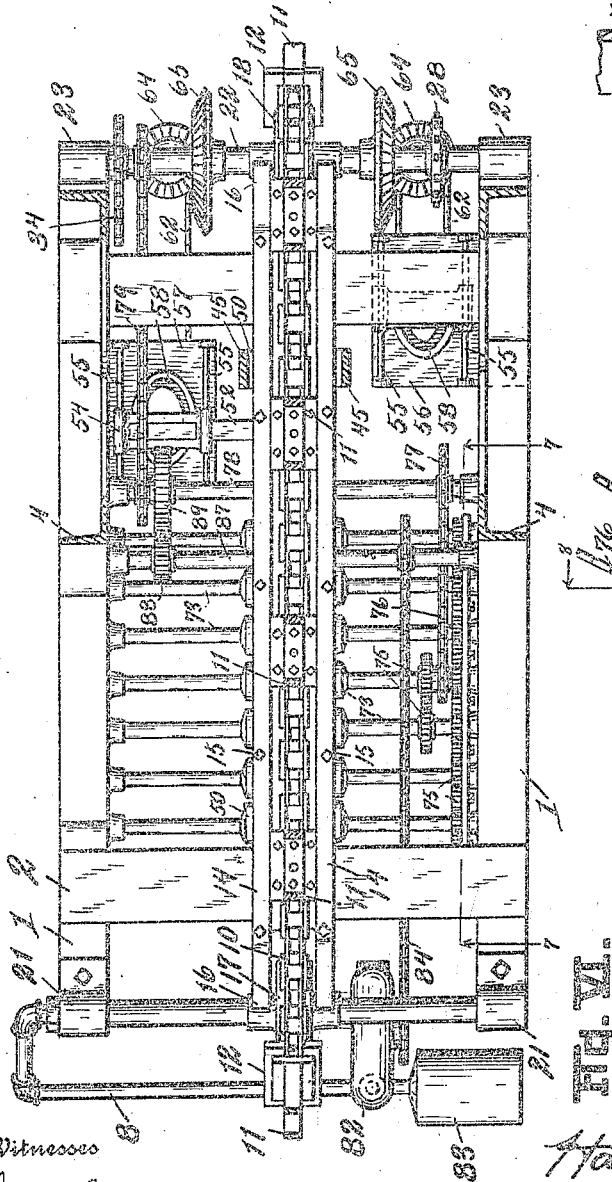
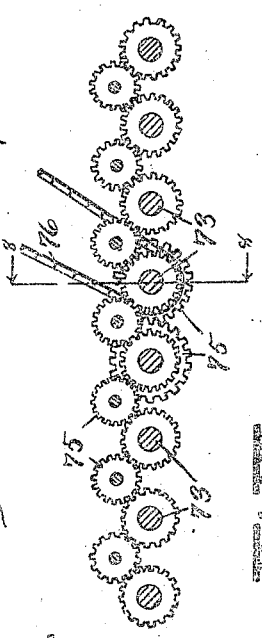
Witnesses
Luella Greenfield
M. Olive Woodruff
Inventor
Harry L. Johnson
By Chappell & Earl
Attorneys

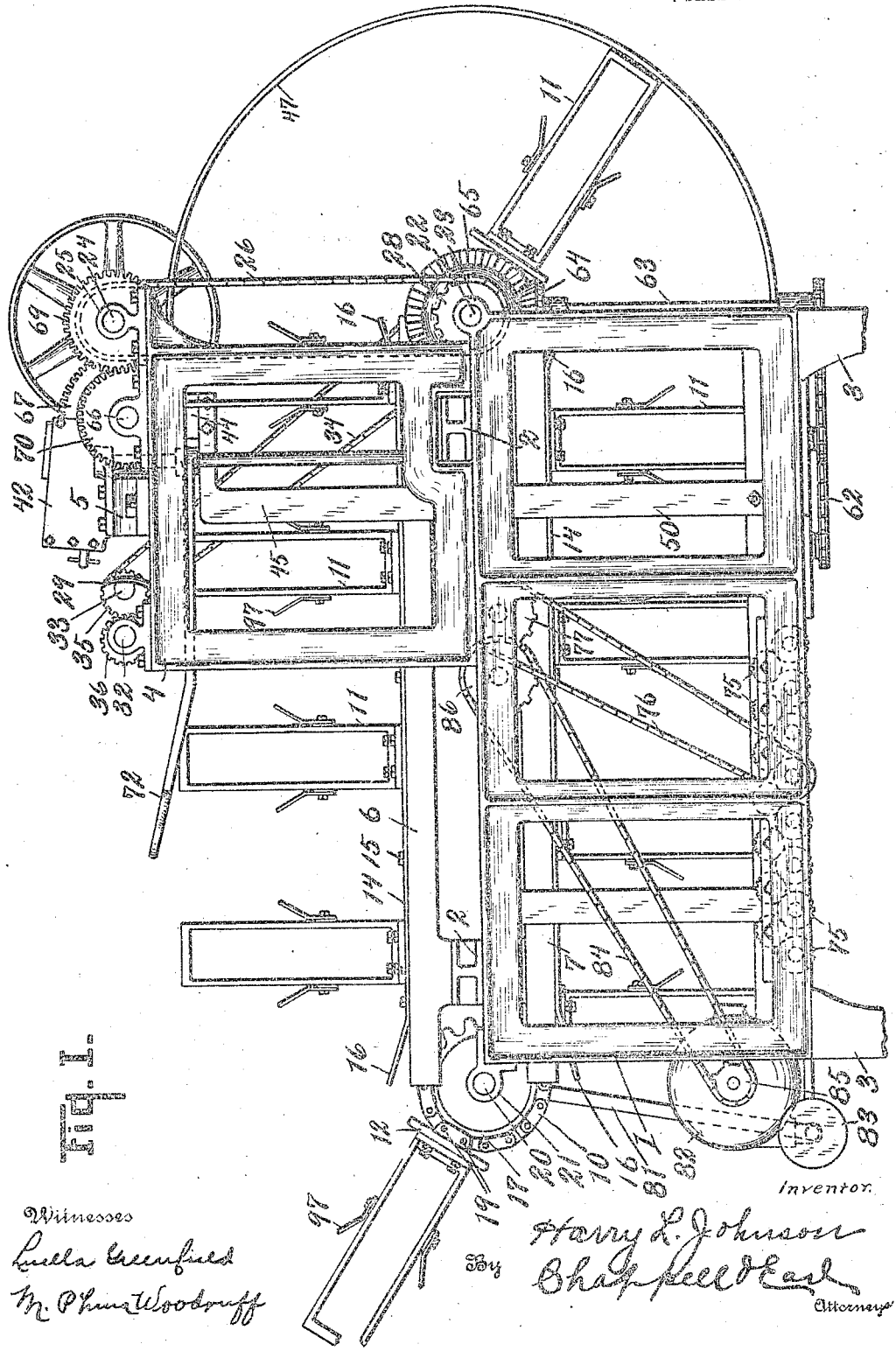

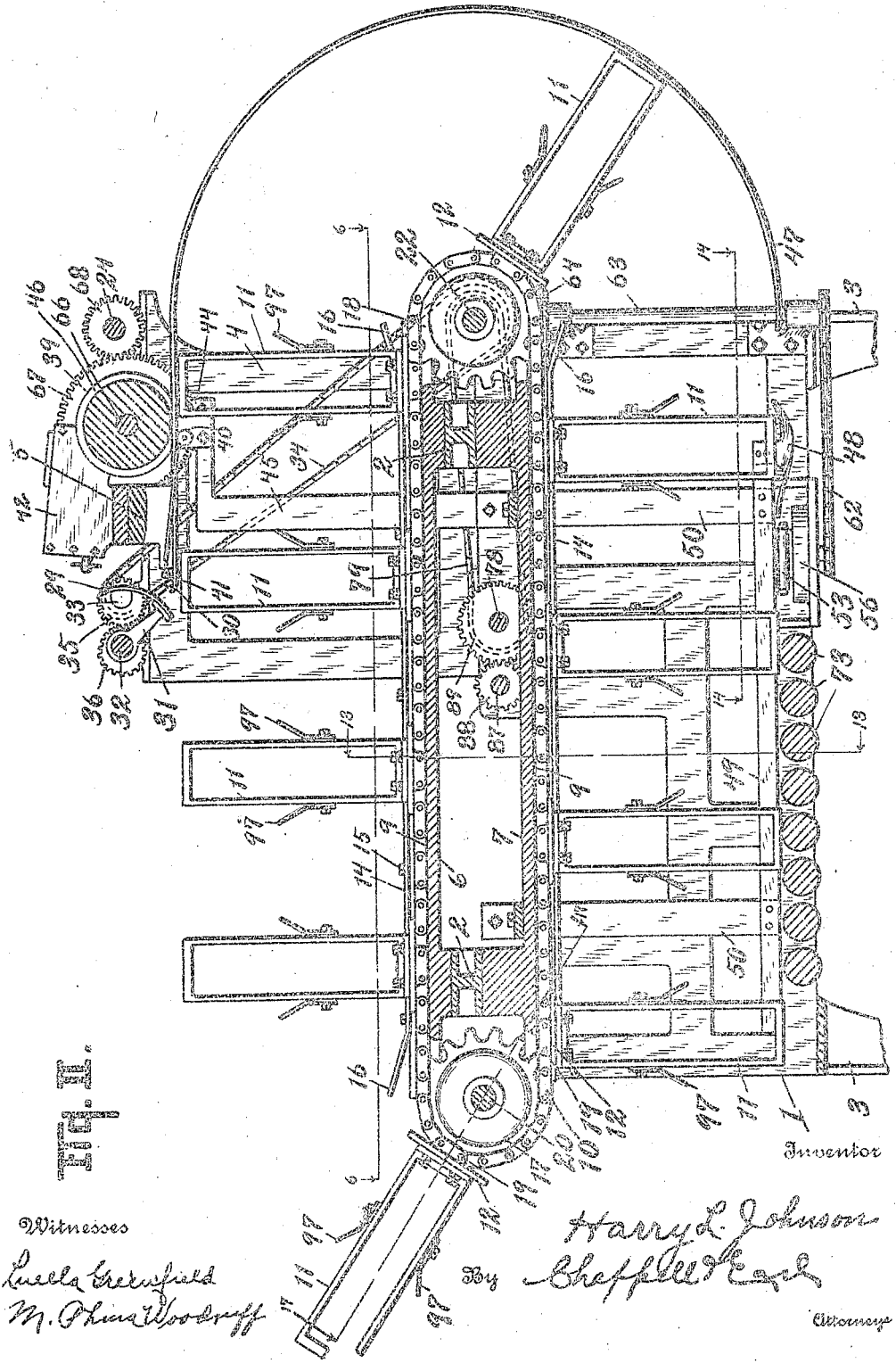

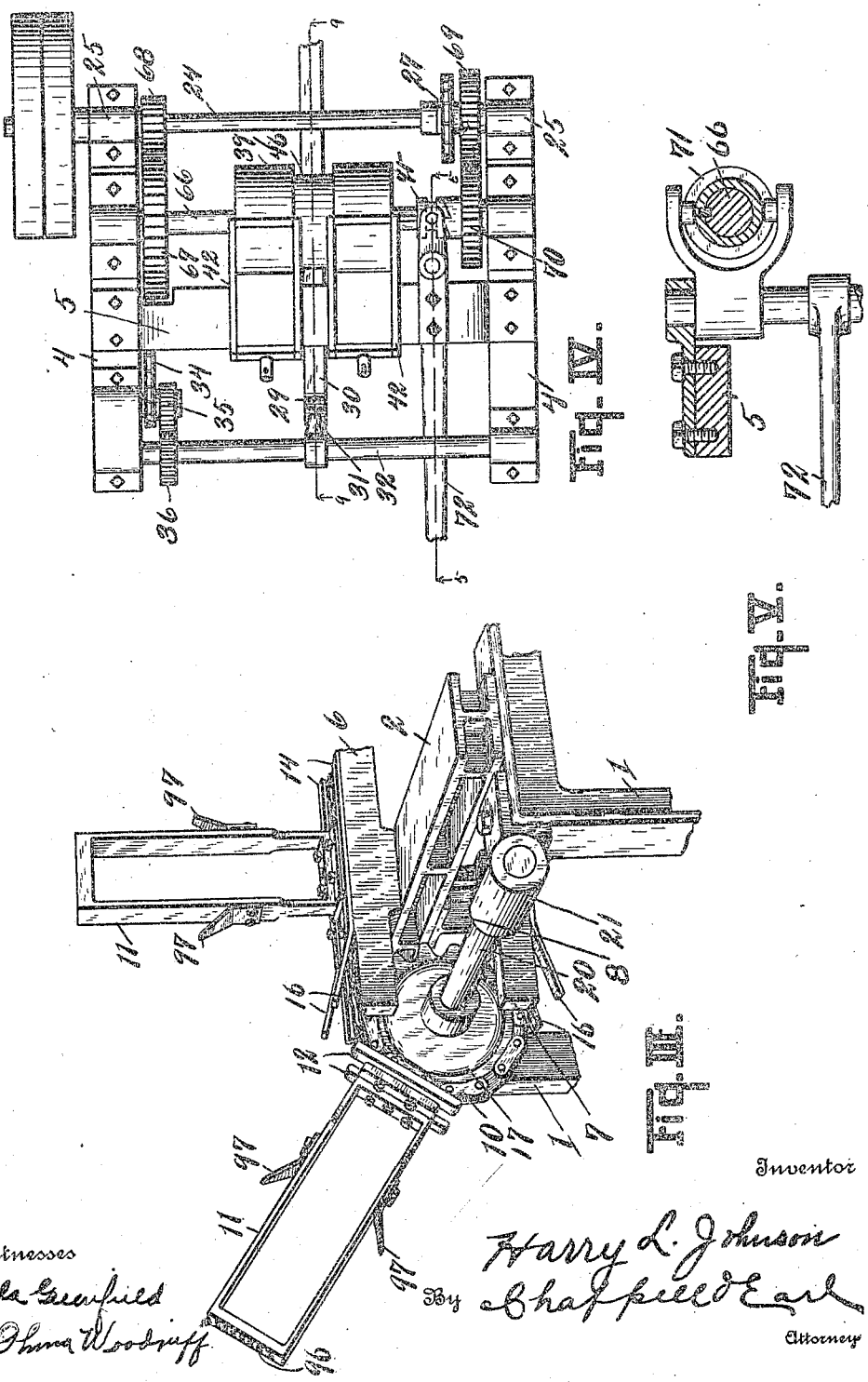

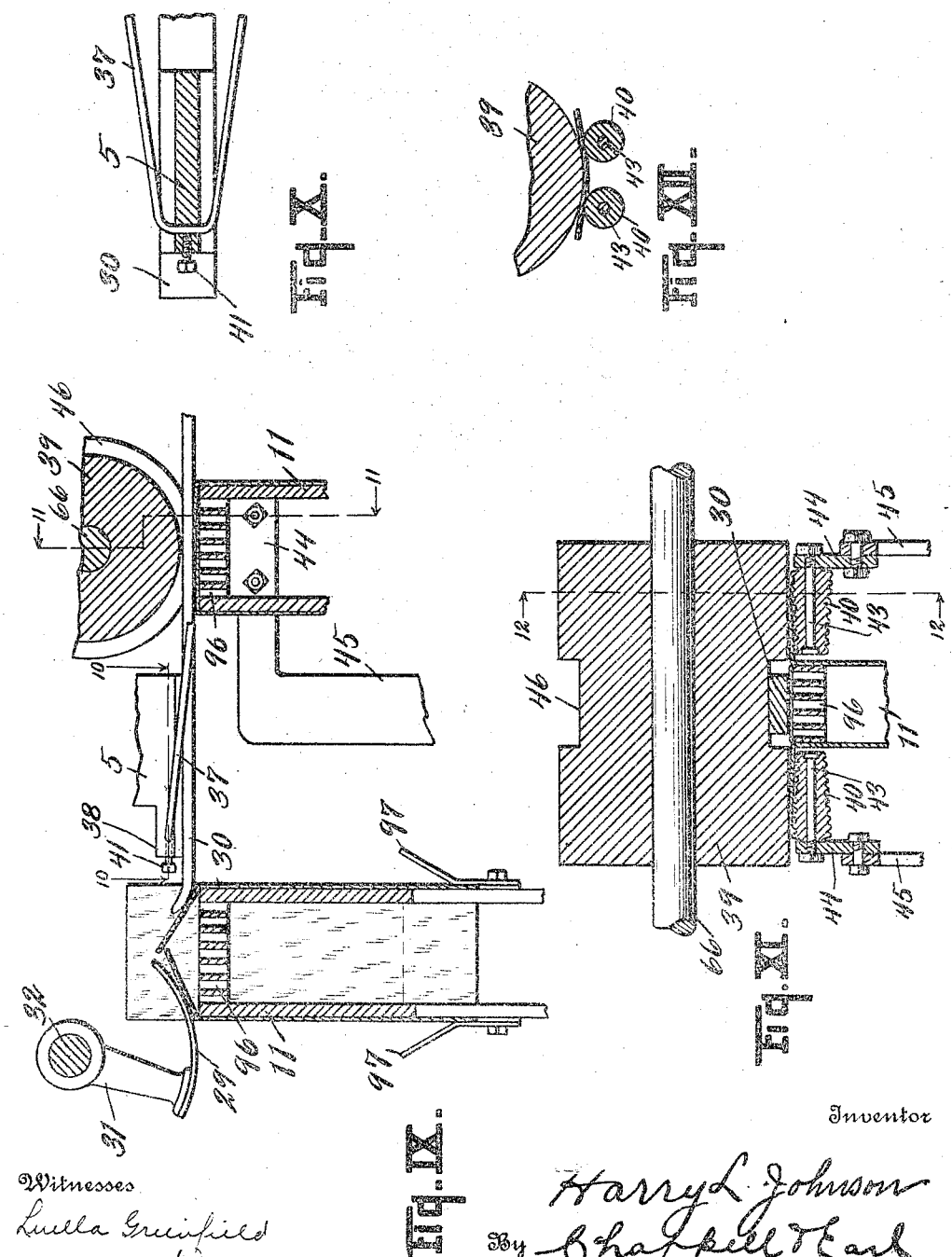

H. L. JOHNSON.
CARTON SEALING MACHINE.
APPLICATION FILED JAN. 27, 1912.
1,052,667.
Patented Feb. 11, 1913.
7 SHEETS—SHEET 6.
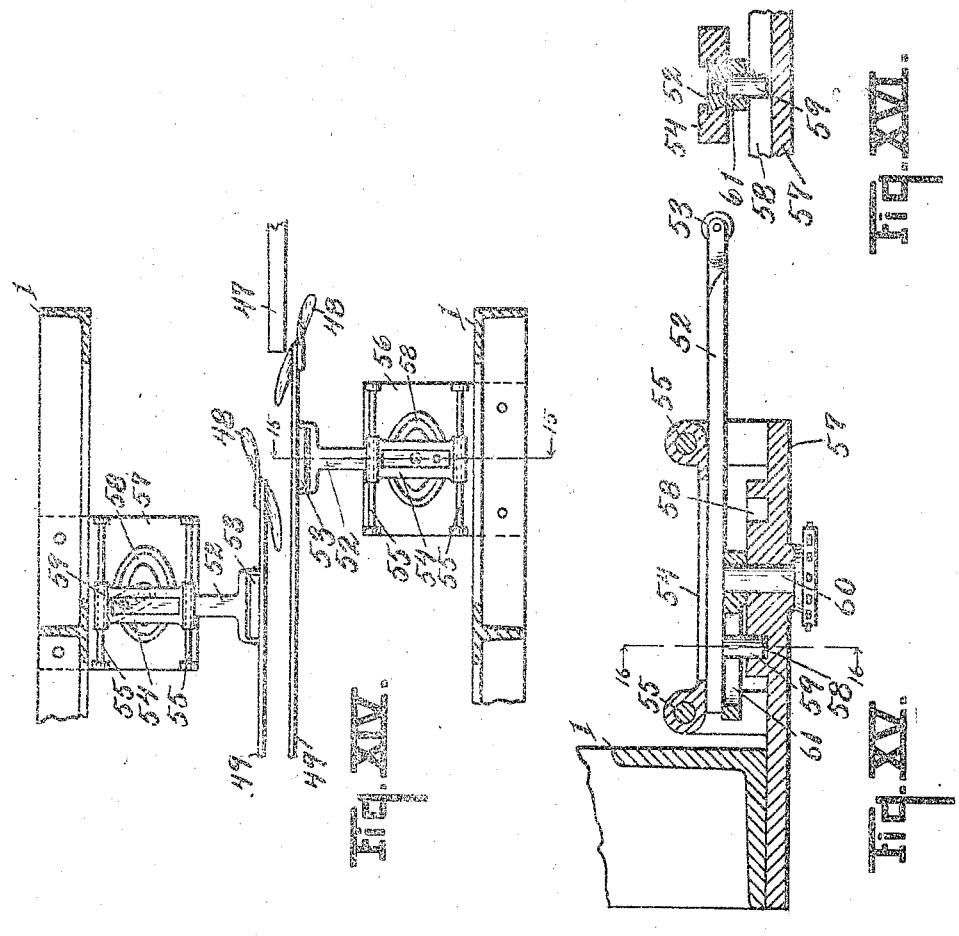
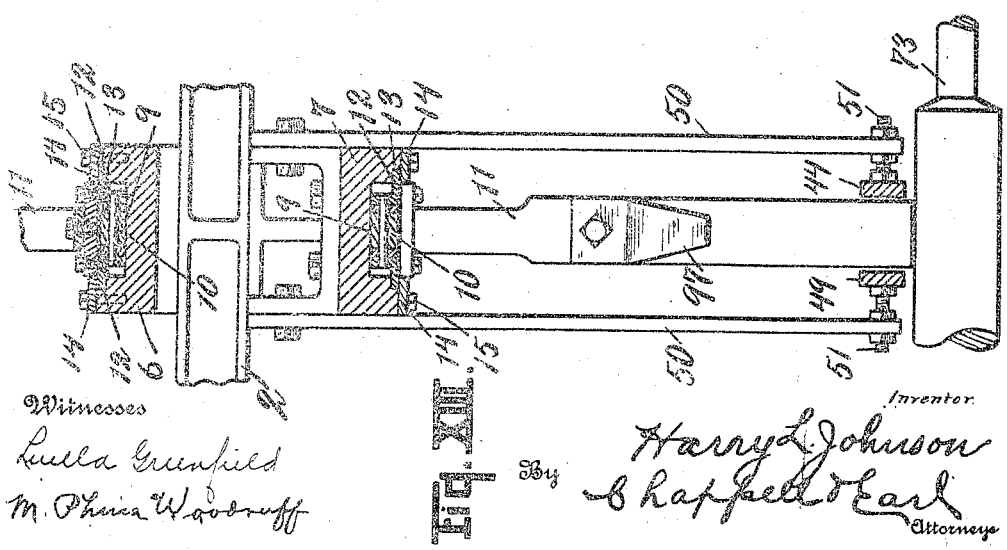

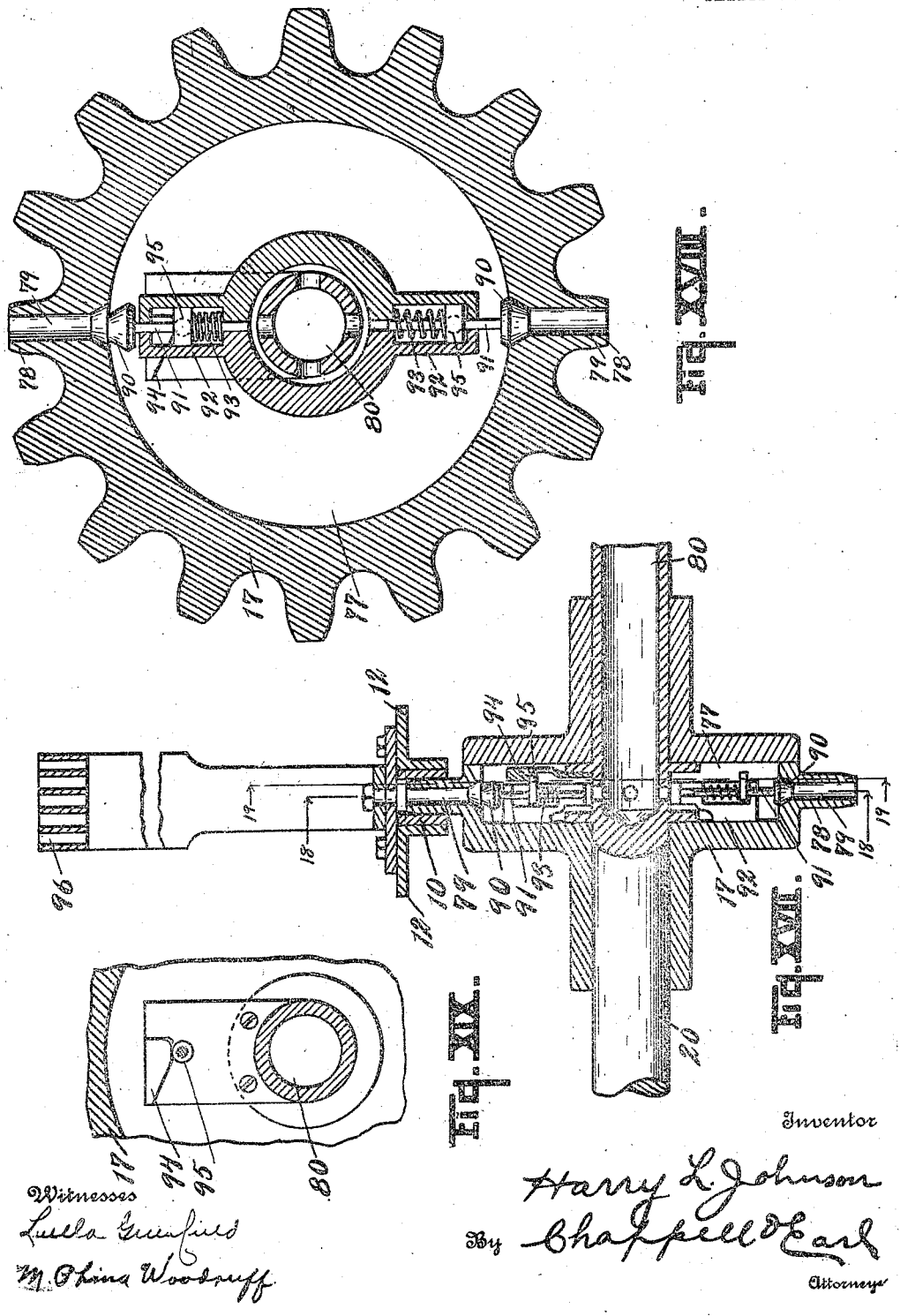

UNITED STATES PATENT OFFICE.

HARRY L. JOHNSON, OF BATTLE CREEK, MICHIGAN, ASSIGNOR TO JOHNSON AUTOMATIC SEALER CO. LTD., OF BATTLE CREEK, MICHIGAN.

CARTON-SEALING MACHINE.

1,052,667.

Specification of Letters Patent.   Patented Feb. 11, 1913.

Application filed January 27, 1912. Serial No. 673,723.

*To all whom it may concern:*

Be it known that I, HARRY L. JOHNSON, a citizen of the United States, residing at the city of Battle Creek, county of Calhoun, and State of Michigan, have invented certain new and useful Improvements in Carton-Sealing Machines, of which the following is a specification.

This invention relates to improvements in carton sealing machines.

The main objects of this invention are, first, to provide an improved carton sealing machine adapted for sealing the bottoms of cartons. Second, to provide an improved carton sealing machine having a large capacity and one which is at the same time simple and compact in structure. Third, to provide an improved carton sealing machine which is entirely automatic except for the placing of the blanks to be sealed upon the carrier or conveyer of the machine. Fourth, to provide an improved means for discharging the sealed cartons from the carrier or conveyer.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is a side view of a structure embodying the features of my invention. Fig. II is a vertical central longitudinal section, the conveyer being shown in full lines. Fig. III is an enlarged detail perspective of the front or left hand end of the machine as shown illustrating details of the conveyer and conveyer ways. Fig. IV is a detail plan view showing parts of the flap folding and gluing mechanism. Fig. V is a detail vertical section taken on a line corresponding to line 5—5 of Fig. IV. Fig. VI is a horizontal section taken on a line corresponding to line 6—6 of Fig. II. Fig. VII is a detail vertical section taken on a line corresponding to line 7—7 of Fig. VI, showing the driving connections for the pressing rolls, the frame and the bearings of the rolls being omitted. Fig. VIII is a detail section taken on a line corresponding to line 8—8 of Fig. VII. Fig. IX is an enlarged detail view partially in vertical section on a line corresponding to line 9—9 of Fig. IV, showing the details of the flap folding and gluing mechanism. Fig. X is a detail horizontal section taken on a line corresponding to line 10—10 of Fig. IX. Fig. XI is a detail vertical transverse section showing details of the gluing mechanism, taken on a line corresponding to the broken line 11—11 of Fig. IX. Fig. XII is a detail vertical longitudinal section taken on a line corresponding to line 12—12 of Fig. XI. Fig. XIII is a detail vertical transverse section showing details of the conveyer and conveyer ways taken on a line corresponding to line 13—13 of Fig. II. Fig. XIV is a detail horizontal section taken on a line corresponding to line 14—14 of Fig. II showing details of the flap folding mechanism. Fig. XV is a detail section taken on a line corresponding to line 15—15 of Fig. XIV. Fig. XVI is a detail section taken on a line corresponding to line 16—16 of Fig. XV. Fig. XVII is an enlarged detail section taken on a line corresponding to line 17—17 of Fig. II showing structural details of the ejecting or discharge mechanism for the conveyer. Fig. XVIII is an enlarged detail section taken on a line corresponding to line 18—18 of Fig. XVII. Fig. XIX is a detail section taken on a line corresponding to line 19—19 of Fig. XVII.

In the drawings, similar reference characters refer to similar parts throughout the several views, and the sectional views are taken looking in the direction of the little arrows at the ends of the section lines.

Referring to the drawing, the frame in the structure illustrated, comprises a pair of side members 1 consisting of horizontal sill pieces and suitable upright cross pieces. These side members are connected by cross sills 2 arranged on the top longitudinal sills of the side members. The side members of the frame are provided with suitable legs 3. At its rear end the frame is built up to support parts of the flap folding and gluing mechanism, the built up part comprising side members 4 which are mounted on side members 1 of the main frame over the rear cross sill 2. The frame members 4 are connected by the top cross piece 5 which assists in making the frame rigid and serves as a support for parts of the mechanism as will appear.

Disposed centrally and longitudinally of the frame, is a conveyer or carrier way comprising a top member 6 and a bottom member 7, the top member 6 being mounted above the frame cross sills 2 while the bottom member 7 is mounted below these sills and beneath the top member 6. The way member 7 is carried by brackets 8 depending from the cross sills 2. The way members 6 and 7 are channeled at 9 to receive the conveyer or carrier chain 10.

The carton holders 11 are mounted at suitable intervals upon this chain and are provided with holder supports 12 which travel in grooves 13 in the sides of the ways. These grooves are for convenience in manufacturing and assembling the parts formed by longitudinally rabbeting the sides of the channels 9 of the way members and securing the bars 14 as by means of the screws 15 so that they overlap the rabbets and coact therewith to form the grooves 13. The ends of these bars 14 are turned outwardly to provide guides 16 for the holder supports 12 and also to permit the swinging of the supports 12 as they pass from the way channels over the sprockets 17 and 18 which are arranged at the ends of the way members and between them. The diameter of the sprockets is such that the conveyer chain is properly supported thereby and delivered into the way channels.

The holder supports 12 are preferably angle pieces secured to the links of the conveyer chain on which the holders 11 are mounted by means of the chain link pins 19. As the supports pass into the grooves of the ways the holders 11 are brought into an upright position and are carried forward in that position to the flap folding and gluing mechanism and over the pressing rolls.

The conveyer sprocket 17 is mounted on a shaft 20 at the front end of the machine, the shaft being carried by bearings 21 mounted on the upper front corners of the frame side members 1. The sprocket 18 is mounted on the shaft 22 which is carried by bearings 23 on the rear upper corners of the side members 1.

The driving shaft 24 is mounted on bearings 25 above the shaft 22. The shaft 22 is driven by the sprocket chain 26 and sprockets 27 and 28. The sprocket 27 is revolubly mounted on the shaft 24 and is connected by the gears 69 and 70 to the shaft 66. The shaft 66 is connected by the gears 67 and 68 to the shaft 24. The object of this arrangement will appear later.

The cartons to be sealed are placed upon the carrier holders 11 at the front of the machine. For convenience in describing the arrangement and operation of the parts of the machine, I refer to the flaps of the cartons as front, rear and side flaps. It will, however, be understood that these designations are only relative to the positions of the cartons as they are acted upon by the machine.

As the cartons are carried along by the conveyer, the rear inner flap is engaged by the flap folder 29 and folded forwardly under the front inner flap. See Fig. IX. This folding is timed so that it is effected just previous to the engagement or folding of the front inner flap by the flap folder and retainer 30 which is a fixed horizontal bar-like member turned upwardly at its forward end so that the flap is pressed down and retained as the carton is carried along.

The flap folder 29 is in the form of a curved shoe or striker carried by an arm 31 on the shaft 32. This shaft 32 is geared to the shaft 33 which is in turn connected to the shaft 22 by the sprocket chain 34 and suitable sprockets on the shafts 33 and 22.

The connection for the shafts 32 and 33 preferably consists of gears 35 and 36. These gears are eccentrically arranged on their shafts so as to secure a variable speed for the shaft 32. This secures a variable movement for the flap folder 29, the operative part of the stroke being quickened so as to insure the folding of the rear inner flap just previous to the folding of the front inner flap of the flap folder 29 as it is carried along by the conveyer at a uniform speed.

As the cartons are carried under the folder 30, the side flaps are engaged by the spreaders or guides 37 arranged at each side of the member 30. These spreaders or guides 37 are preferably formed of an A-shaped rod arranged through a support 38 on the cross piece 5. These guides 37 are inclined rearwardly to spread and guide the side flaps to the glue roll 39 and the supporting rolls 40. The guides 37 are adjustably supported by the set screw 41. See Figs. IX to XII inclusive.

The glue receptacles 42 are mounted on the cross piece 5 to deliver to the glue roll. The side flaps are supported as they are being acted upon by the glue roll by the supporting idlers 40 there being two of them at each side. These supporting rollers 40 are tapered inwardly, their spindles 43 being arranged parallel with the face of the glue roller so that the outer ends of the rollers are closer to the glue roller than their inner ends. These supporting rollers are arranged in spaced pairs, there being one at each side of the vertical plane of the axes of the glue roller so that the flaps are held effectively in contact with the glue roller. See Fig. XII.

The inner ends of the rollers being farther away from the periphery of the glue wheel do not apply such stress to the flaps as would be likely to tear them or the carton. Further, these idlers 40 being tapered, the tendency is to carry the flaps inward, which further guards against distorting or tearing the carton.

The spindles 43 are mounted on plate-like brackets 44, carried by the uprights 45. See Figs. I and IX. The glue roller has a central peripheral groove 46 adapted to receive the flap closing and retaining bar 30. This retaining bar is provided with a curved portion or extension 47 at the rear of the machine which retains the front and rear flaps in their closed position until one of the side flaps is engaged by the first flap folder 48. These flap folders 48 are shaped somewhat like a mold board and as the cartons are at this point of their progress inverted relative to their position when acted upon by the glue roller, the flap folders 48 engage the under or outer sides of the side flaps, turning them inwardly. These flap folders are arranged on the ends of the horizontally disposed bars 49. These bars 49 are arranged parallel and are supported by the hangers 50 so that the carriers with the cartons thereon move between them as shown in Fig. XIII. The bars are adjustably supported by means of the bolts 51.

At the rear of each flap folder 48 is a flap presser 52 provided with an engaging roller 53 that moves inwardly and forwardly pressing the inner side flap against the folded inner flaps to seal it thereon and the outer side flap upon the sealed inner side flap to seal it thereon. These flap pressers 52 are carried by carriages 54 mounted on rod-like ways 55 carried by the brackets 56. See Figs. XIV, XV and XVI. The carriages are moved back and forth on these ways and flap pressers are reciprocated by means of the cams 57 which have cam grooves 58 in their faces, the cams being located below the carriages. The reciprocating pressers 52 are provided with pins 59 which engage the cam grooves 58.

The vertical shafts 60 are provided with slotted arms 61 which engage these pins 59 so that the shafts are revolved, the pins are carried around in the cam grooves, thus reciprocating the presser arms as well as the carriages. This secures an inward and forward work stroke for these pressers. The flap folders and pressers are arranged in series,—that is, one flap folder and its presser are arranged to act and then the other. This side flap sealing mechanism is similar to that shown in my application for patent for carton sealing machines, filed August 4, 1908, Serial No. 446,893.

The shafts 60 are connected by the sprocket chains 62 and suitable sprockets to the shafts 63 which are in turn connected by the gears 64 and 65 to the shaft 22. The glue roll shaft 66 is connected by the gears 67 and 68 to the driving shaft 24. The sprocket 27 and the gear 69 which is connected thereto, are loosely or revolubly mounted on the shaft 24 and driven through the gear 70 on the glue roll shaft which is arranged in mesh with the gear 69. As the conveyer is driven through this sprocket 27 and the sprocket chain 26, the conveyer and the folding mechanism is controlled by the clutch 71 on the glue roll shaft 66, this clutch being arranged to connect the gear 70 with the shaft. The clutch is controlled by the lever 72. This provides driving means which permits the stopping of the conveyer and the sealing mechanism without stopping the glue roller. If the glue roller were stopped frequently or for any considerable length of time, it would soon become encumbered with the glue so that it would be necessary to clean the same. By thus arranging the driving connections, proper timing of the parts is secured.

After the cartons leave the side flap sealing devices, the sealed flaps are engaged by a series of flap pressing and retaining rollers 73. These rollers are provided with gears 74 which are connected in train by gears 75. See Fig. VII. One of the rollers 73 is provided with a sprocket 77 on the shaft 77'. This shaft is connected by the sprocket chain 77" and suitable sprocket wheels to the driven shaft 22. These press or flap retaining rolls retain the flaps until the glue becomes sufficiently set to hold them.

The sealed cartons are discharged or ejected from the holders automatically. The mechanism for accomplishing this in the structure illustrated, consists of the sprocket wheel 17 which has an air chamber 77 therein. The teeth 78 of the wheel 17 are provided with air passages 79 so that they are nozzles in effect. These nozzle teeth are disposed so as to engage the links having the carton holders thereon. In the structure illustrated, there are two of the tooth-like nozzles.

The shaft 20 is provided with an air passage 80 which is connected by the pipe 81 to the pump 82 and the pressure tank 83. The pump 82 is shown in conventional form, of the rotary type. This pump is connected by the sprocket chain 84 and the sprocket wheels 85 and 86 to the shaft 87. This shaft 87 is connected by the gears 88 and 89 to the shaft 78.

The delivery of air through the nozzle 78 is controlled by the valves 90, the stems 91 of which are supported to reciprocate in suitable bearing brackets 92 on the wheel within its chamber 77. The springs 93 on the valve stems hold the valves normally closed.

The sprocket wheel 17 is revolubly mounted on its shaft 20, the wheel being driven through the conveyer. On the shaft 20 is a cam 94 positioned to engage the members 95 on the valve stems 91 as the sprocket is revolved alternately, opening the valves and allowing the escape of the compressed air. This discharges through the nozzle into the holders 11, the outer ends 96 of which are perforated so that the sealed cartons are blown off or ejected from the holders. This takes place at the front end of the machine.

The holders 11 are provided with diverging stops 97 which engage the carton and support it in proper operative position on the holders.

Having described the mechanism in detail, I will now point out its cycle of operation.

The open ended cartons are placed by the operator upon the holders 11 at the front of the machine. As the cartons are carried along by the conveyer, the rear inner flap is folded by the flap folder 29. The front inner flap is folded by the flap holder 30 upon the rear inner flap and the inner flaps are held in their folded positions by this flap folder bar and the curved extension or retaining bar 47 until the side flap folding mechanism is reached. At the rear of the flap folder 29, the side flaps are engaged by the guides 37 and guided between the glue roller 39 and the supporting idlers 40. The holders 11 then pass over the rear sprocket 18 to the second member of the conveyer way and the side flaps are acted upon by the flap folders 48 and the flap pressers 52 from which they pass to the retaining and pressing rollers 73 across which they are carried to the front end of the machine and automatically discharged. By arranging the parts in this manner, a very compact structure is provided and one which is simple and economical as well. The machine is capable of very rapid operation and an operator finds it possible to place the cartons upon the holders very rapidly. The machine is, as stated, entirely automatic except for the placing of the cartons on the holders. By arranging the glue mechanism at the top of the machine and the side flap closing mechanism at the bottom, these parts are spaced so that the glue has an opportunity to become tacky before the side flaps are closed. At the same time, the machine is not enlarged or lengthened by the provision of such a space. This is of advantage as it allows the use of thin glue which enables its being applied more evenly and with less waste than where thicker or tackier glue must be used.

I have illustrated and described various features of my improved sealing machine in detail in the preferred form in which I have embodied my invention.

I have not attempted to illustrate or describe the various modifications which are possible as the disclosure made will enable those skilled in the art to which this invention relates to adapt my improvements as taste or circumstances may dictate. I desire however, to be understood as claiming the same specifically in the form illustrated as well as broadly within the scope of the appended claims.

Having thus described my invention, what I claim as new and desire to secure by Letters Patent is:

1. In a structure of the class described, the combination of the conveyer chain; a chambered sprocket; a shaft having a passage therein connected to a source of air supply under pressure and delivering to said chambered sprocket, said sprocket being revolubly mounted on said shaft and provided with nozzles adapted to act as teeth; holders mounted on said conveyer chain, the holders being mounted on links adapted to engage said nozzle teeth and provided with passages alined with said nozzles when the links carrying the holders are engaged therewith; valves for said nozzles; supports for said valves arranged within said sprocket chamber; springs arranged to hold said valves normally closed; and a cam mounted on said shaft within said sprocket chamber and adapted to act on the valves to open the same as the sprocket is revolved.

2. In a structure of the class described, the combination of the conveyer chain; a chambered sprocket; a shaft having a passage therein connected to a source of air supply under pressure and delivering to said chambered sprocket, said sprocket being revolubly mounted on said shaft and provided with nozzles adapted to act as teeth; holders mounted on said conveyer chain, the holders being mounted on links adapted to engage said nozzle teeth; valves for said nozzles; and a cam mounted on said shaft within said sprocket chamber and adapted to act on the valves to open the same as the sprocket is revolved.

3. In a structure of the class described, the combination of the conveyer chain; a chambered sprocket; a shaft having a passage therein connected to a source of air supply under pressure and delivering to said chambered sprocket, said sprocket being revolubly mounted on said shaft and provided with a nozzle adapted to act as a tooth; holders mounted on said conveyer chain, the holders being mounted on links adapted to engage said nozzle tooth; a valve for said nozzle; and a cam mounted on said shaft within said sprocket chamber and adapted to act on the valve to open the same as the sprocket is revolved.

4. In a structure of the class described, the combination of the conveyer chain; holders mounted thereon; a chambered sprocket having nozzles adapted to act as teeth; a supply of air under pressure connected to said chambered sprocket; valves controlling said nozzles; and a cam adapted to act on said valves to open the same as the sprocket is revolved.

5. In a structure of the class described, the combination of the conveyer chain; holders mounted thereon; a chambered sprocket having a nozzle adapted to act as a tooth; a supply of air under pressure connected to said chambered sprocket; a valve controlling said nozzle; and means for opening said valve as the sprocket is revolved.

6. In a structure of the class described, the combination of the conveyer chain; holders mounted thereon; a sprocket having a nozzle adapted to act as a tooth; and means for intermittently delivering air under pressure to said nozzle.

7. In a structure of the class described, the combination of the conveyer; holders mounted thereon; a wheel driven with said conveyer provided with a nozzle adapted to deliver air to said conveyer holders as they are brought into alinement therewith in passing over the wheel; a supply of air under pressure connected to said nozzle; a valve controlling said nozzle; and means for opening said valve as the wheel is revolved.

8. In a structure of the class described, the combination of the conveyer; holders mounted thereon; a wheel driven with said conveyer provided with a nozzle adapted to deliver air to said conveyer holders as they are brought into alinement therewith in passing over the wheel; and means for intermittently delivering air to said nozzle.

9. In a structure of the class described, the combination of the conveyer, holders mounted thereon, and a wheel driven with said conveyer and provided with air delivery means adapted to deliver air to said conveyer holders as they are brought into alinement with the air delivery means in passing over the wheel.

10. In a structure of the class described, the combination of the conveyer, holders mounted thereon, and a supporting wheel for one end of said conveyer provided with means for delivering air to said holders as they are brought into alinement therewith in passing over the wheel.

11. In a structure of the class described, the combination of the conveyer provided with carton holders, a wheel rotating with said conveyer and provided with means for delivering air to said holders as they are brought into alinement in passing over the wheel.

12. In a structure of the class described, the combination of a conveyer having carton holders thereon; a conveyer way comprising sections arranged one above the other, the upper section being disposed to face upwardly, the bottom section being disposed to face downwardly; supporting wheels for said conveyer arranged at the ends of the way sections; an inner flap folding means comprising a rear inner flap folder adapted to fold the rear inner flap forward as the cartons are carried along by the conveyer; a shoe-like front flap folder adapted to fold the front inner flap upon the rear inner flap; a curved flap retainer at the rear of the conveyer adapted to retain the inner flaps in their folded position as the conveyer passes over the rear conveyer supporting wheel; a glue applying device for the side flaps there being a space between the said inner flap folding and said glue applying means and the front conveyer wheel to permit placing of the cartons upon the holders after the holders have passed the front conveyer wheel; side flap folding and sealing means arranged below the conveyer whereby the glue applying and side flap folding means are spaced to permit the glue to become partially set prior to the folding of the side flaps upon the inner flaps; a series of pressing and retaining rollers arranged in front of said side flap folding and sealing means and over which the sealed flaps are carried, said rollers being arranged below the open space of the upper section of the conveyer; and an ejector means arranged to discharge the sealed cartons as the carton holders pass over the front conveyer supporting wheel.

13. In a structure of the class described, the combination of a conveyer having carton holders thereon; a conveyer way comprising sections arranged one above the other, the bottom section being arranged to face downwardly; supporting wheels for said conveyer arranged at the ends of the way sections; an inner flap folding means; a flap retainer at the rear of the conveyer arranged to retain the inner flaps in their folded position as the conveyer passes over the rear conveyer supporting wheel; a glue applying device for said flaps, there being a space between the said flap folding and glue applying means and the front conveyer wheel to permit placing of the cartons upon the holders after the holders have passed the front conveyer supporting wheel; side flap folding and sealing means arranged below the conveyer whereby the glue applying and side flap folding means are spaced to permit the glue to become partially set prior to the folding of the side flaps upon the inner flaps; and an ejector means arranged to discharge the sealed cartons at the front end of the conveyer.

14. In a structure of the class described, the combination of a conveyer having holders mounted thereon; a conveyer way comprising sections arranged one above the other, the bottom section being arranged to face downwardly; supporting wheels for said conveyer arranged at the ends of the way sections; an inner flap folding means comprising rear inner flap folder adapted to fold the rear inner flap forward as the cartons are carried along by the conveyer; a shoe-like front flap folder adapted to fold the front inner flap; a curved flap retainer at the rear of the said conveyer adapted to retain the inner flaps in their folded position as the conveyer passes over the rear conveyer support; a glue applying device for the flaps, said inner flap folding means and glue applying device being arranged above the conveyer, said side flap closing and sealing means being arranged below the conveyer whereby the glue applying and side flap folding devices are spaced to permit the glue becoming partially set prior to the folding of the flaps together.

15. In a structure of the class described, the combination of an endless conveyer; a conveyer way comprising sections arranged one above the other, the bottom section being arranged to face downwardly; supporting wheels for said conveyer arranged at the ends of the way sections; an inner flap folding means; a glue applying device for the side flaps, an inner flap retaining means arranged to retain the inner flaps during the passage of the holders from the upper to the lower reaches of the conveyer; a side flap closing and sealing means, said inner flap folding means and glue applying device being arranged above the conveyer, said side flap closing and sealing means being arranged below the conveyer whereby the glue applying and side flap folding devices are spaced to permit the glue becoming partially set prior to the folding of the flaps together, a series of retaining rollers arranged in front of said side flap closing means and over which the sealed flaps are carried, said retaining rollers being connected by a train of gears to be driven in the same direction; and an ejector means arranged to discharge the sealed cartons as the carton holders pass over the front conveyer wheel.

16. In a structure of the class described, the combination of an endless conveyer; a conveyer way comprising sections arranged one above the other, the bottom section being arranged to face downwardly; supporting wheels for said conveyer arranged at the ends of the way sections; an inner flap folding means; a glue applying device for the side flaps, an inner flap retaining means arranged to retain the inner flaps during the passage of the holders from the upper to the lower reaches of the conveyer; and a side flap closing and sealing means, said inner flap folding means and glue applying device being arranged above the conveyer, said side flap closing and sealing means being arranged below the conveyer whereby the glue applying and side flap folding devices are spaced to permit the glue becoming partially set prior to the folding of the flaps together.

17. In a structure of the class described, the combination of an endless conveyer, having holders thereon; supporting wheels for said conveyer; an inner flap folding means; a glue applying device for the side flaps, an inner flap retaining means arranged to retain the inner flaps during the passage of the holders from the first to the second reaches of the conveyer; a side flap closing and sealing means arranged to act while the holders are on the second reach of the conveyer, said inner flap folding means and glue applying device being arranged to act while the holders are on the first reach of the conveyer whereby space is provided to permit the partial setting of the glue prior to the folding of the glued flaps, a series of pressing and retaining rollers arranged in front of said side flap closing means and over which the sealed flaps are carried; and an ejector means arranged to discharge the sealed cartons as the carton holders pass over the front conveyer supporting wheel.

18. In a structure of the class described, the combination of an endless conveyer, having holders thereon; supporting wheels for said conveyer; an inner flap folding means; a glue applying device for the side flaps, an inner flap retaining means arranged to retain the inner flaps during the passage of the holders from the first to the second reaches of the conveyer; and a side flap closing and sealing means arranged to act while the holders are on the second reach of the conveyer, said inner flap folding means and glue applying device being arranged to act while the holders are on the first reach of the conveyer whereby space is provided to permit the partial setting of the glue prior to the folding of the glued flaps.

19. In a structure of the class described, the combination with a conveyer having holders thereon; and a glue applying roller arranged transversely above said conveyer and flap supporting rollers arranged in co-acting spaced pairs below said roller to support the carton flaps in contact with said glue roller as the cartons are carried past the same, the flaps being slightly curved by said rollers as they contact with the glue roll, said rollers being inwardly tapered and having circumferential grooves, the axes of the rollers being parallel with the axis of the glue roller so that their inner ends are farther away from the same than their outer.

20. In a structure of the class described, the combination with a conveyer having holders thereon; and a glue applying roller arranged transversely above said conveyer and flap supporting rollers arranged in co-acting spaced pairs below said roller to support the carton flaps in contact with said glue roller as the cartons are carried past the same, the flaps being slightly curved by said rollers as they contact with the glue roll, said rollers being inwardly tapered.

21. In a structure of the class described, the combination of a conveyer; a glue roller; flap supporting rollers coacting with said glue roller; flap guides arranged in front of said glue roller, said guides being a U-shaped rod supported by the loop thereof; and a set screw engaging said loop whereby the guides are adjustably supported.

In witness whereof, I have hereunto set my hand and seal in the presence of two witnesses.

HARRY L. JOHNSON. [L. S.]

Witnesses:
GEO. C. McKAY,
F. L. CONDON.